United States Patent [19]

Kanda et al.

[11] Patent Number: 4,621,034
[45] Date of Patent: Nov. 4, 1986

[54] SEALED METAL OXIDE-HYDROGEN STORAGE CELL

[75] Inventors: Motoya Kanda; Yuji Sato, both of Yokohama; Eriko Shincho, Tokyo; Kiyoshi Mitsuyasu, Yokohama, all of Japan

[73] Assignee: Kabushiki Kaisha Toshiba, Kawasaki, Japan

[21] Appl. No.: 759,310

[22] Filed: Jul. 26, 1985

[30] Foreign Application Priority Data

Jul. 31, 1984 [JP] Japan ................. 59-160527
Sep. 27, 1984 [JP] Japan ................. 59-202711
Sep. 27, 1984 [JP] Japan ................. 59-202712

[51] Int. Cl.$^4$ ................. H01M 12/06; H01M 10/34
[52] U.S. Cl. ................. 429/59; 429/101; 29/623.1
[58] Field of Search ................. 429/59, 60, 101; 29/623.1

[56] References Cited

U.S. PATENT DOCUMENTS

| | | | |
|---|---|---|---|
| 4,004,943 | 1/1977 | Boter | 429/59 |
| 4,166,886 | 9/1979 | Bonnaterre | 429/60 |
| 4,214,043 | 7/1980 | Van Deutekom | 429/60 |

Primary Examiner—Donald L. Walton
Attorney, Agent, or Firm—Oblon, Fisher, Spivak, McClelland & Maier

[57] ABSTRACT

Disclosed is a method of producing a sealed metal oxide-hydrogen storage cell, comprising the step of housing in a container a cathode containing a metal oxide as an active material, an anode containing a hydrogen storage alloy as the main component, a separator for separating the cathode and the anode, a pre-charging member, and an electrolyte solution consisting of an alkaline aqueous solution. The pre-charging member is electrically combined with the anode and consists of a metal having a less noble potential than the hydrogen electrode potential within the alkaline solution. A material containing said metal as the main component may also be used as the pre-charging member. The storage cell has a desired anode-cathode capacity balance and exhibits a long life.

17 Claims, 4 Drawing Figures

SEALED METAL OXIDE-HYDROGEN STORAGE CELL

BACKGROUND OF THE INVENTION

I. Field of the Invention

The present invention relates to an improvement of a sealed metal oxide-hydrogen cell comprising an anode formed of a hydrogen storage alloy.

II. Description of the Prior Art

Recently, a sealed metal oxide-hydrogen cell comprising a cathode formed of a metal oxide and an anode formed of a hydrogen storage alloy attracts attention as a cell exhibiting a high energy density. The basic construction of the cell, which belongs to the alkaline cell, should be equal to that of the nickel-cadmium cell. What is particularly important in the cell of this type is the capacity balance between the cathode and the anode.

Generally, the anode capacity is greater than the cathode capacity in the sealed alkaline cell. In the product cell after completion of all the manufacturing steps, it is necessary for the excess portion of the anode capacity to be partly charged. In this case, the residual excess portion of the anode capacity should remain uncharged even under the condition that the cell has been charged for the cathode to reach the full charge state. In other words, the anode does not reach the full charge state even if the full charge state has been reached in the cathode, with the result that the hydrogen generation from the anode can be suppressed. It follows that it is possible to prevent the internal pressure of the cell from being elevated by the hydrogen generation even under the overcharge. Also, the excess portion of the anode capacity is partly charged in advance as described above in order to enable the cathode to fully exhibit its performance and to prevent the charge from being completely released even under a slight overdischarge. As a result, the cell is prevented from being deteriorated so as to ensure a long life of the cell.

In assembling a cell having the capacity balance of the cathode and anode described above, it is necessary to charge in advance the anode in the required amount corresponding to a portion of the excess capacity of the anode in question. Thus, in the nickel-cadmium cell, the cadmium anode is generally charged in the formation step. The cadmium anode charged as required in the formation step is incorporated after water-wash and drying into a sealed container together with the cathode.

However, a serious problem is brought about, if the pre-charge process of the cadmium anode described above is applied to the hydrogen storage alloy anode of the sealed metal oxide-hydrogen cell. Specifically, since the charged active material is hydrogen, hydrogen is readily released from the hydrogen storage alloy anode in the process after the formation step. It should be noted that, under the air atmosphere, the released hydrogen is burned on the surface of the hydrogen storage alloy anode. Under the inert gas atmosphere, burning does not take place but hydrogen is promptly released to the outer atmosphere.

To prevent the hydrogen release problem, it is necessary to carry out all the steps after the formation step under the atmosphere having a hydrogen partial pressure higher than the equilibrium plateau pressure of the hydrogen storage alloy which forms the anode. In this case, however, some steps of the cell assembling process are carried out under the hydrogen atmosphere, with the other steps being carried out under the air atmosphere. It follows that air tends to enter the hydrogen atmosphere, and vice versa, in the cell assembling process. Naturally, the mixing of the air with hydrogen possibly causes ignition of hydrogen. In order to prevent the hydrogen ignition problem, a large facility and troublesome operations are required. In short, serious problems must be solved for pre-charging a part of the capacity of the anode of a hydrogen storage alloy in the formation step.

SUMMARY OF THE INVENTION

An object of the present invention is to provide a method of producing a sealed metal oxide-hydrogen storage cell comprising a hydrogen storage alloy anode with a desired charge condition. The method of the present invention makes it possible to produce the desired cell without employing a hydrogen gas atmosphere.

According to the present invention, there is provided a method of producing a sealed metal oxide-hydrogen storage cell, comprising the step of housing in a container a cathode containing a metal oxide as an active material, an anode containing a hydrogen storage alloy as the main component, a separator for separating the cathode and the anode, a pre-charging member electrically combined with the anode and consisting of a metal having a less noble potential than the hydrogen electrode potential within an alkaline solution or a material containing said metal as the main component, and an electrolyte solution consisting of an alkaline aqueous solution.

The pre-charging member electrically combined with the anode permits the anode to be automatically pre-charged in a desired amount during the assembling process such as the sealing step of the storage cell, making it possible to obtain a storage cell having a satisfactory capacity balance of the cathode and anode.

Specifically, a hydrogen storage alloy performs the electrochemical reaction within an alkaline aqueous solution as shown below:

  (1)

where M denotes the hydrogen storage alloy, and M.H denotes the hydrogen storage alloy having hydrogen stored therein. The electrode potential of this reaction is substantially equal to that of the so-called "hydrogen electrode reaction."

Suppose a metal M' has an electrode potential less noble than the potential of the hydrogen electrode reaction. Usually, such metal undergoes the following electrode reaction in an alkaline solution:

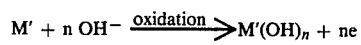

where n denote the valence of the metal M' when the metal is dissolved in the solution. Where the metal M' is electrically combined with the hydrogen storage alloy within an alkaline aqueous solution, the electrode potential exhibited by the connected system is rendered intermediate between the electrode potentials of the two original metals. In other words, the metal M' is subjected to the anode polarization, with the hydrogen storage alloy M being subjected to the cathode polarization. It should be noted that formula (1) given above substantially represents the cathode polarization of the hydrogen storage alloy M, denoting that the alloy is substantially charged. In this step, the metal M' undergoes the electrode reaction as noted above, forming generally a hydroxide. Since the hydrogen storage alloy continues to be charged as far as the metal M' is present, it is possible to control the amount of charging of the hydrogen storage alloy by properly determining the amount of the metal M' in advance.

The anode can be readily charged by applying the above-noted reaction to the hydrogen storage alloy anode. Specifically, an anode formed of a hydrogen storage alloy and having a required amount of the metal M' electrically combined therewith in advance is put in a container together with a cathode, followed by pouring an electrolyte solution into the container and subsequently sealing the container so as to produce a cell. What should be noted is that the hydrogen storage alloy begins to be gradually charged upon pouring of the electrolyte solution, and continues to be charged until the metal M' is oxidized. Since the amount of charging of the anode can be readily controlled by the amount of the metal M', the cell can be assembled very easily.

In the present invention, the pre-charging member can be electrically combined with the anode by, for example, allowing the metal constituting the pre-charging member to be supported on the hydrogen storage alloy which forms the anode. Alternatively, the pre-charging member formed in a strip shape may be electrically connected to the anode for the electric combination of the pre-charging member with the anode. The strip-shaped pre-charging member may be brought into direct contact with the anode, or may be formed to cover the inner wall of the container which acts as the terminal of the anode.

The metal M' used in the present invention includes, for example, tin, germanium, molybdenum, zinc, chromium, silicon, iron, indium, vanadium, manganese, boron, aluminum and zirconium. Particularly preferred are metals which can be ionized by the anodic oxidation so as to be dissolved in the electrolytic solution such as tin, germanium, molybdenum, zinc, chromium and silicon. Where the metal M' of this kind is supported on the hydrogen storage alloy, pores are formed in the metal-supported portion of the anode after the pre-charging of the anode, leading to an improved porosity of the anode and, thus, to a further improvement of the storage cell. Where the metal M' is of a strip shape and contacts the anode, the metal M' is partly dissolved in the electrolyte solution, making it possible to ensure the contact area between the anode and the electrolyte solution as designed.

It should be noted that the metal M' constituting the pre-charging member, which is supported on the hydrogen storage alloy, leads to reduction in the amount of the hydrogen storage alloy and, thus, to reduction in the anode capacity. Naturally, the amount of the metal M' should desirably be small in order to prevent the anode capacity from being diminished. However, it is impossible to ensure the required pre-charging amount if the amount of the metal M' is unduly small. It should be noted in this connection that the amount of the metal M' can be decreased without diminishing the anode capacity, if the electrolyte solution is allowed to contain a lower alcohol. In general, the metal M' serves to pre-charge the anode, with the alcohol serving to prevent the cathode from being charged. Where the electrolyte solution contains a lower alcohol, however, the carbonate ions $CO_3^{2-}$ formed by the decomposition of the alcohol deteriorate the anode and cathode characteristics. The difficulty mentioned can be overcome by allowing the electrolytic solution to contain LiOH. In this case, the carbonate ions formed by the decomposition of the alcohol are deposited in the form of $Li_2CO_3$ so as to prevent deterioration of the electrode characteristics.

The lower alcohols used in the present invention include, for example, methanol, ethanol, propanol, butanol, and pentanol. Particularly preferred is methanol, ethanol or propanol.

Any kind of hydrogen storage alloy can be used in the present invention for forming the anode. For example, the hydrogen storage alloys used in the present invention include $AB_5$ type alloys such as $LaNi_5$, $LaCo_5$, $MmNi_5$ (Mm representing a misch metal: a mixture of a rare earth metal such as La, Ce, Pr and Sm), and $LmNi_5$ (Lm representing a misch metal rich in La); and alloys of $AB_{5-x-y}Q_xL_y$ ($0<x$, $y<5$) such as $MmNi_{4.2}Mn_{0.8}$ and $LmNi_{4.2}Mn_{0.6}Al_{0.2}$. It is also possible to use alloys of 5 or 6 members in addition to the above-exemplified alloys of 2-4 members. Further, alloys of FeTi series, MgNi series, TiMn series and ZrNi series can also be used in the present invention. Particularly preferred are alloys having a low plateau pressure and a large plateau region such as $MmNi_{4.2}Mn_{0.8}$ and $LmNi_{4.2}Mn_{0.6}Al_{0.2}$. The hydrogen storage alloys exemplified above may be used singly or in combination.

The cathode may be formed of nickel oxide, silver oxide or the like in the present invention.

DETAILED DESCRIPTION OF THE PREFERRED EMBODIMENTS

Figure 1:
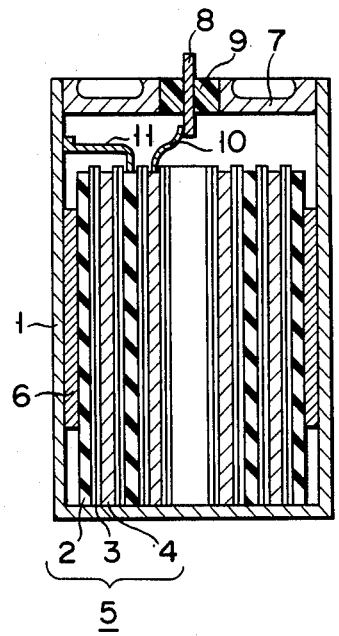
FIG. 1 is a cross sectional view showing a sealed metal oxide-hydrogen storage cell according to one embodiment of the present invention.
Figure 2:
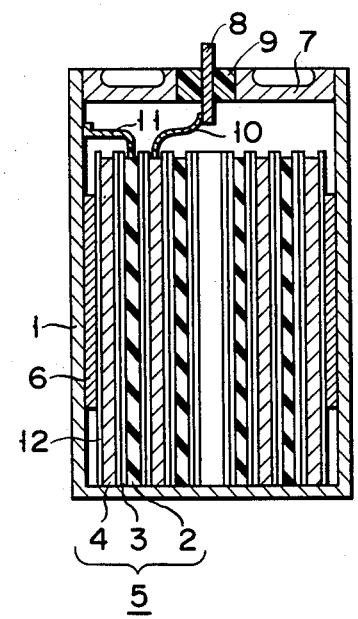
FIG. 2 is a cross sectional view showing a sealed metal oxide-hydrogen storage cell according to another embodiment of the present invention.

FIGS. 1 and 2 show sealed metal oxide-hydrogen storage cells according to first and second embodiments of the present invention, in which a pre-charging member of a strip shape is arranged within a container. As seen from the drawings, a cell element 5 consisting of an anode 2 and a cathode 4 which are spirally wound with a separator 3 interposed therebetween is housed in a container 1. The open end of the container 1 is sealed with a sealing member 7. Also, a cathode terminal 8 extends through an insulating member 9 provided in the central portion of the sealing member 7. The cathode terminal 8 is connected to the cathode 4 via a cathode lead wire 10. On the other hand, the anode 2 is connected to the container 1 via an anode lead wire 11.

In the cell shown in FIG. 1, the anode 2 forms the outermost layer of the cell element 5. A metal strip 6 acting as the pre-charging member is disposed between the anode 2 and the container 1 in direct contact with the anode 2. Incidentally, the metal strip 6 may be disposed not to contact the anode 2 directly. In this case, the metal strip 6 should be connected to the anode 2 or the container 1 via a lead wire, unless the metal strip 6 is in direct contact with the container 1.

In the embodiment of FIG. 2, the cathode 4 constitutes the outermost layer of the cell element 5. Thus, if the metal strip 6 is disposed between the cathode 4 and the container 1 in contact with both of them, the cathode 4 is electrically connected via the metal strip 6 to the container constituting the anode terminal. To avoid the problem, an insulating sheet 12 is provided between the cathode 4 and the metal strip 6 for the insulating purpose.

The size of the metal strip should be determined in view of the required pre-charging amount of the anode.

In the present invention, the pre-charging member is not restricted to the metal strip 6 mentioned above. Alternatively, the metal constituting the pre-charging member may be supported on the hydrogen storage alloy. Specifically, the metal in question may be mixed into the anode.

It is possible to decrease the amount of the pre-charging member by adding a lower alcohol to the electrolyte solution. In this case, it is desirable to add LiOH to the electrolyte solution so as to remove harmful carbonate ions which are generated by decomposition of the lower alcohol.

To be more specific, lower alcohols such as methyl, ethyl and propyl alcohols are readily subjected to anodic oxidation shown in formula (3) within an alkaline solution. In addition, the anodic oxidation proceeds under a potential lower than that for charging the nickel electrode, i.e., the oxidation reaction shown in formula (2):

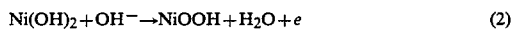

$$Ni(OH)_2 + OH^- \rightarrow NiOOH + H_2O + e \qquad (2)$$

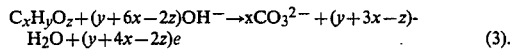

$$C_xH_yO_z + (y+6x-2z)OH^- \rightarrow xCO_3^{2-} + (y+3x-z)H_2O + (y+4x-2z)e \qquad (3).$$

If the charging is performed with a lower alcohol added to the electrolyte solution in an attempt to secure the excess anode capacity to be pre-charged, the reaction (3) given above is carried out on the cathode in place of the reaction (2), with the result that the cathode is not charged at all.

On the other hand, the anode is ordinarily charged so as to achieve the proper charging state of the cathode and anode. In the discharge step, the reverse reaction of the formula (3) does not proceed. Thus, a proper charging state of the anode and cathode is maintained thereafter in principle. However, the $CO_3^{2-}$, i.e., carbonate ions shown in formula (3) deteriorate the electrode characteristics of the nickel cathode and the hydrogen storage alloy anode. Specifically, the carbonate ions gradually diminish the cathode capacity and make the discharge potential of the anode non-uniform. As a result, cell voltage is lowered at the time of the high rate of discharge. In short, the alcohol addition is certainly effective for achieving a proper charging state, but produces detrimental effects over a long period of time. In order to obtain cells of satisfactory characteristics, it is necessary to suppress the formation of carbonate ions and to decrease the concentration of the carbonate ions in the electrolyte solution. Under the circumstances, it is desirable to use lower alcohols such as methanol, ethanol and propanol, as apparent from formula (3). However, it is unavoidable for carbonate ions to be formed even in the case of using such lower alcohols as exemplified above.

To overcome the problem, lithium hydroxide (LiOH) is further added in the present invention to the electrolyte solution containing KOH and NaOH. It should be noted that the solubility of lithium carbonate ($Li_2CO_3$) in water is 1.33 g/100 g.$H_2O$ (20° C.) in contrast to 21.6 g/100 g.$H_2O$ (20° C.) for $Na_2CO_3$ and 105.5 g/100 g.$H_2O$ (20° C.) for $K_2CO_3$. Since the solubility of lithium carbonate is very low as mentioned above, the carbonate ions formed by adding a prescribed amount of lithium hydroxide to the electrolyte solution is deposited as lithium carbonate. In other words, the carbonate concentration of the electrolyte solution is restricted by the solubility of lithium hydroxide. Incidentally, lithium hydroxide, which has a molecular weight of 23.95, has a solubility of 12.7 g/100 g.$H_2O$ (20° C.), which is higher than that of lithium carbonate whose molecular weight is as large as 73.89. It follows that the lithium hydroxide addition fully achieves the object of depositing the carbonate ions as lithium carbonate.

When it comes to a sealed AA size cell, the required amount of the electrolyte solution as 8M—KOH is about 2 ml. If the rate capacity of the cell is 500 mAh (or the theoretical loading capacity of the cathode is 600 mAh), the required theoretical capacity of the anode is 1100 mAh including the maximum excess charging state of, for example, 250 mAh. If all the required theoretical loading capacity mentioned is achieved by methanol, the amount of methanol required is 0.05 g ($1.6 \times 10^{-3}$ moles), which is derived from formula (3). Suppose methanol completely reacts with LiOH to form lithium carbonate. In this case, 0.12 g ($1.6 \times 10^{-3}$ moles) of lithium carbonate is formed in 2 ml of the alkaline solution, or 2.6 g of the solution if the solution has a specific gravity of 1.3. The solubility of lithium carbonate in water somewhat differs from that in an alkaline solution. However, if the solubility of lithium carbonate in the alkaline solution is thought to be equal to that in water, the amount of lithium carbonate dissolved in 2.6 g of the alkaline solution is: $1.33 \times (2.6/100) = 0.035$ g (or $4.7 \times 10^{-4}$ mole). It follows that, if the electrolyte solution contains a sufficient amount of lithium hydroxide, lithium carbonate in the amount of 0.095 g (i.e., 0.12−0.035) or $1.3 \times 10^{-3}$ mole, is deposited as a solid material in the electrolyte solution. In other words, the presence of lithium hydroxide in the electrolyte solution permits markedly decreasing the amount of the carbonate ions ($CO_3^{2-}$) contained in the electrolyte solution. Specifically, the amount of the carbonate ions is decreased from $1.6 \times 10^{-3}$ mole in the case of absence of lithium hydroxide to $4.7 \times 10^{-4}$ mole, leading to an increased life of the cell.

It is possible to properly select the amount of the alcohol addition in accordance with the amount of the metal constituting the pre-charging member. The amount of the lithium hydroxide addition, which can also be properly selected in view of the kind (the number of carbon atoms) and addition amount of the lower alcohol, should generally be 50 to 500 mole % of the lower alcohol amount.

The particular effect of the present invention will be apparent from Examples of the invention described in following. A strip-like pre-charging member is used in each of Examples 1 and 2. Example 3 covers a case where the pre-charging member is supported on the anode electrode. Further, a lower alcohol and lithium hydroxide are added to the electrolyte solution in Example 4.

EXAMPLE 1

Prepared was a AA size sealed nickel-hydrogen cell comprising a cathode formed of nickel oxide and an anode formed of $LaNi_{4.7}Al_{0.3}$ having an equilibrium plateau pressure of about 0.5 atm. at 30° C. The capacities of the cathode and anode were set as follows so as to set the rated capacity of the cell at 500 mAh. Specifically, the theoretical capacities of the nickel oxide cathode and hydrogen anode were set at 600 mAh and 1100 mAh, respectively, such that the hydrogen anode had an excess capacity of 500 mAh. Thus, it was necessary to pre-charge partly the excess capacity of 500 mAh mentioned above, with the residual part of the excess capacity left non-charged. In this experiment, the excess capacity of 200 mAh was pre-charged, with the residual excess capacity of 300 mAh left non-charged.

For preparing the cell, a dispersion of polytetrafluoroethylene (PTFE) was added to 7 g of powdery $LaNi_{4.7}Al_{0.3}$ such that the mixture contained 4% of the solid PTFE component, followed by kneading the mixture and, then, rolling the kneaded mass so as to prepare a sheet sized at 70 mm×40 mm and having a thickness of 0.6 mm. Then, a nickel mesh having a lead piece attached thereto was pressed against the sheet so as to prepare an anode electrode. A cell element was prepared by spirally winding the sheet-like anode electrode thus prepared together with a sheet-like nickel oxide cathode electrode sized at 50 mm×40 mm×0.6 mm (thickness) and having a theoretic capacity of 600 mAh, with a separator interposed between the anode and cathode electrodes. The cathode electrode mentioned was under the discharge state. The resultant cell element was put in a metallic cell case for AA cell having a zinc plate formed on the inner surface in advance, said zinc plate being sized at 30 mm×5 mm and weighing 0.4 g. Then, the anode lead and the cathode lead of the cell element were bonded by resistance welding to the inner surface of the metallic casing and the cathode terminal formed in the sealing plate, respectively. Finally, 2.0 ml of an electrolyte solution consisting of an 8M—KOH aqueous solution was poured into the container, followed by sealing the container so as to prepare the desired cell.

Before the pouring of the electrolyte solution, the cathode and anode electrodes within the container were under the discharge state. However, the poured electrolyte solution promptly caused the zinc plate to begin to be dissolved within the anode so as to charge the anode, as shown below:

$$Zn + 4OH^- \rightarrow Zn(OH)_4^{2-} + 2e \quad (4)$$

It should be noted that 0.4 g of zinc corresponds to 200 mAh. Thus, upon completion of the reaction given in formula (4), the anode material, i.e., $LaNi_{4.7}Al_{0.3}$, is pre-charged.

EXAMPLE 2

A sealed nickel-hydrogen cell was prepared as in Example 1, except that the zinc plate formed on the inner surface of the metallic case in Example 1 was replace by 0.4 g of a zinc film plated on the inner surface of the metallic case.

CONTROL 1

A sealed nickel-hydrogen cell was prepared as in Example 1, except that the zinc plate formed on the inner surface of the metallic case in Example 1 was not formed in this experiment.

CONTROL 2

An anode of $LaNi_{4.7}Al_{0.3}$ was pre-charged in the formation step by 200 mAh, followed by water-washing and, then, drying the anode. The pre-charged anode was spirally wound together with a nickel oxide cathode, with a separator interposed therebetween, so as to prepare a cell element. After the cell element was put in a metallic container, an electrolyte solution was poured into the container. Further, the container was sealed under an $H_2$—Ar atmosphere of 1 atm having a hydrogen partial pressure of 0.5 atm so as to prepare a sealed nickel-hydrogen cell.

Figure 3:
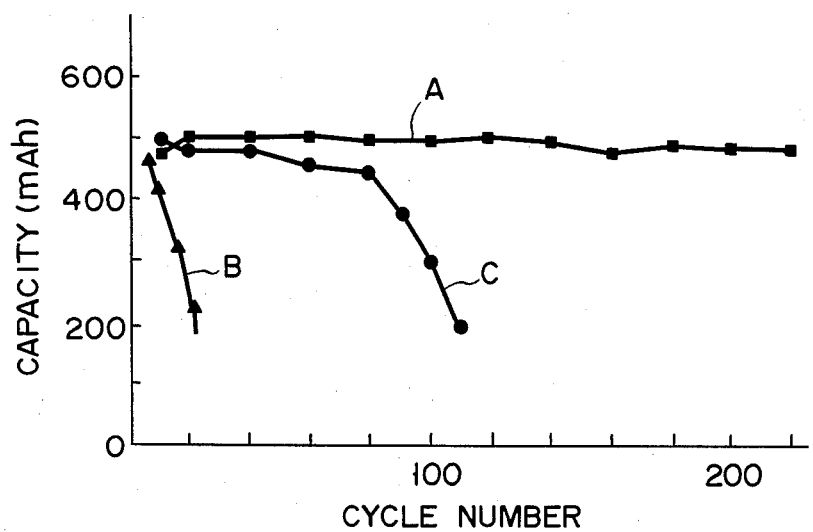
FIGS. 3 and 4 are graphs each showing the relationship between the charge-discharge cycle number and the capacity with respect to the sealed metal oxide-hydrogen storage cell of the present invention and the conventional storage cell.

Each of the cells prepared in Examples 1, 2 and Controls 1, 2 was subjected to a cycle life test to repeat a cycle consisting of charging with 150 mA for 5 hours and discharging with 200 mA down to 1.0 V, with the results as shown in FIG. 3. The average values of six cells are plotted in FIG. 3 for each of the Examples and Controls mentioned above. Curve A shown in FIG. 3 represents Examples 1 and 2, with curves B and C denoting Controls 1 and 2, respectively. FIG. 3 shows that the life of the cell ended with 20 cycles in Control 1 (curve B), with the life ending with 100 cycles in Control 2 (curve C). On the other hand, the cells of Examples 1 and 2 were found to exhibit the life longer than 200 cycles.

Another test was applied to the cells of Examples 1, 2 and Control 2. Specifically, these cells were dismantled so as to take out the cell elements. Each of the cell elements was promptly put in a beaker filled with a 8M—KOH aqueous solution so as to measure the residual anode capacity. Table 1 shows the maximum, minimum and average values of six anodes which were subjected to the test for each of Examples 1, 2 and Control 2. Incidentally, the residual anode capacity for Control 1 was found to be 0 mAh.

TABLE 1

|  | Average (mAh) | Max (mAh) | Min (mAh) |
|---|---|---|---|
| Example 1 | 195 | 210 | 195 |
| Example 2 | 205 | 230 | 200 |
| Control 2 | 160 | 195 | 20 |

As apparent from Table 1, the cell of Control 2 was low in its average value of the residual anode capacity and exhibited a large difference between the maximum and minimum values. In Examples 1 and 2, however, the cells exibited desired values of the residual anode capacities which were small in the difference between the maximum and minimum values.

EXAMPLE 3

A sealed storage cell was prepared as in Example 1. In Example 1, a zinc plate was formed on the inner surface of the cell case. In Example 3, however, a zinc powder was supported by $LaNi_{4.7}Al_{0.3}$ constituting the anode.

Specifically, 7 g of a powdery $LaNi_{4.7}Al_{0.3}$ having a particle size of 20 $\mu$m or less was mixed with 0.4 g of zinc powder having a particle size of about 10 $\mu$m, followed by adding a polytetrafluoroethylene (PTFE)

dispersion to the mixture such that the entire system contained 4% of the solid PTFE component. The resultant system was fully mixed and kneaded, followed by rolling the kneaded mass so as to prepare a sheet sized at 70 mm×40 mm and having a thickness of 0.6 mm. Then, a nickel mesh having a lead piece attached thereto was fixed to the sheet so as to prepare an anode. On the other hand, a nickel oxide electrode sized at 50 mm×40 mm and having a thickness of 0.6 mm, which was under a discharge state, was prepared as a cathode. The theoretic capacity of the cathode was 600 mAh. The anode and the cathode, which were superposed one upon the other with a separator interposed therebetween, were spirally wound so as to prepare a cell element. The resultant cell element was housed in a AA metallic cell container, followed by connecting the anode lead and the case lead to the metal case and the sealing plate, respectively, by resistance welding. Further, 2.0 ml of an 8M—KOH aqueous solution acting as the electrolyte was poured into the case, followed by promptly sealing the case so as to prepare a cell.

The storage cell thus prepared was subjected to a cycle test, with the result that the life of the cell was found substantially equal to that of the storage cell prepared in Example 1. The cell was also found to be substantially equal to the cell prepared in Example 1 in the residual anode capacity.

EXAMPLE 4

Prepared was a sealed nickel-hydrogen cell of AA size, comprising a cathode formed of nickel oxide and an anode formed of $LaNi_{4.7}Al_{0.3}$ having an equilibrium plateau pressure of about 0.5 atm. at 30° C. The cathode and anode capacities of the cell were set as follows so as to allow the cell to have a rated capacity of 500 mAh. Specifically, the theoretical capacities of the nickel oxide electrode, i.e., the cathode, and the hydrogen electrode, i.e., the anode, were set at 600 mAh and 1100 mAh, respectively. Thus, it was necessary to pre-charge a part of the 500 mAh of the excess capacity of the hydrogen electrode. In this experiment, 200 mAh of the 500 mAh of the excess capacity was pre-charged, with the residual 300 mAh left uncharged. Also, the pre-charging was achieved by the metal zinc for 50 mAh and by the methanol contained in the electrolyte solution for the residual 150 mAh.

To be more specific, 7 g of a powdery $LaNi_{4.7}Al_{0.3}$ having a particle size of 20 $\mu$m or less and 0.1 g of zinc powder, which corresponds to 50 mAh, having a particle size of about 10 $\mu$m were mixed, followed by adding a dispersion of PTFE to the mixture such that the entire system contained 4% of the solid PTFE component. The resultant system was fully mixed and kneaded, followed by rolling the kneaded mass so as to prepare a sheet sized at 70 mm×40 mm and having a thickness of 0.6 mm. Then, a nickel mesh having a lead piece attached thereto was fixed to the sheet so as to prepare an anode. On the other hand, a nickel oxide electrode sized at 50 mm×40 mm and having a thickness of 0.6 mm, which was under a discharge state, was prepared as a cathode. The theoretical capacity of the cathode was 600 mAh. The anode and the cathode, which were superposed one upon the other with a separator interposed therebetween, were spirally wound so as to prepare a cell element. The resultant cell element was housed in a AA metallic cell case, followed by connecting the anode lead and the cathode lead to the metal case and the sealing plate, respectively, by resistance welding. Further, 2.0 ml of an aqueous solution containing 1 mole/l of LiOH, 7 mole/l of KOH and 0.03 g of methanol, which corresponds to 150 mAh, and acting as the electrolyte was poured into the case. In other words, the electrolyte solution contained $2 \times 10^{-3}$ mole of LiOH and $0.96 \times 10^{-3}$ mole of methanol. Finally, the case was promptly sealed so as to prepare a cell.

EXAMPLE 5

A sealed nickel-hydrogen storage cell was prepared as in Example 4, except that 2.0 ml of an 8M—KOH aqueous solution which contained 0.03 g of methanol and did not contain LiOH was used in Example 5.

Figure 4:
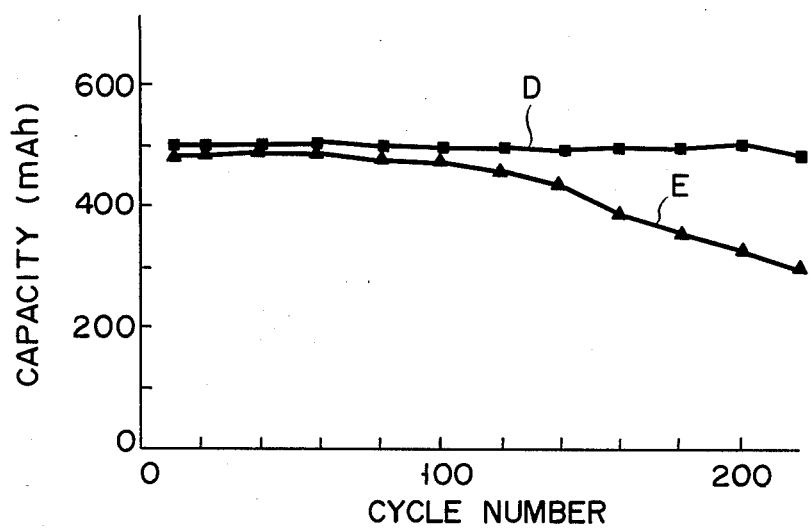

A cycle life test as in Example 1 was applied to the storage cells prepared in Examples 4 and 5 so as to measure the change in the cell capacity with the number of cycles, with the result as shown in FIG. 4. Curves D and E shown in FIG. 4 cover Examples 4 and 5, respectively. FIG. 4 clearly shows that the storage cell of Example 4 (curve D) was superior to the cell of Example 5 (curve E) in life. In Example 5, the carbonate ions contained in the electrolyte solution adversely affected the cell, leading to a short life, compared with Example 4 in which the electrolyte solution contained a reduced carbonate ions due to the presence of LiOH.

As described above in detail, the present invention provides a method of producing a sealed metal oxide-hydrogen storage cell comprising a hydrogen-storage alloy anode, having a good capacity balance between the anode and cathode, and having a long life. In the present invention, a hydrogen atmosphere is not employed in any step of assembling the storage cell.

What is claimed is:

1. A method of producing a sealed metal oxide-hydrogen storage cell, comprising the step of housing in a container a cathode containing a metal oxide as an active material, an anode containing a hydrogen storage alloy as the main component, a separator for separating the cathode and the anode, a pre-charging member electrically combined with the anode and consisting of a metal having a less noble potential than the hydrogen electrode potential within an alkaline solution or a material containing said metal as the main component, and an electrolyte solution consisting of an alkaline aqueous solution.

2. The method according to claim 1, wherein the pre-charging member is a metal selected from the group consisting of tin, germanium, molybdenum, zinc, chromium, silicon, iron, indium, vanadium, manganese, boron, aluminum, and zirconium.

3. The method according to claim 1, wherein the pre-charging member consists of a strip disposed between the anode and the inner wall of the container acting as the anode terminal such that the strip is in contact with both the anode and the inner wall of the container.

4. The method according to claim 1, wherein the pre-charging member is disposed between the cathode and the inner wall of the container acting as the anode terminal such that the pre-charging member is in direct contact with the container and an insulating material is interposed between the pre-charging member and the cathode.

5. The method according to claim 1, wherein the pre-charging member is a thin film formed on the inner surface of the container acting as the anode terminal, said thin film being formed by a method selected from the group consisting of plating, sputtering and evaporation.

6. The method according to claim 1, wherein the pre-charging member is supported by the hydrogen storage alloy.

7. The method according to claim 6, wherein a mixture consisting of a powder of the metal constituting the pre-charging member and a powder of the hydrogen storage alloy is kneaded together with a binder so as to allow the pre-charging member to be supported by the hydrogen storage alloy.

8. The method according to claim 1, wherein a lower alcohol is added to the electrolyte solution.

9. The method according to claim 8, wherein the lower alcohol is at least one compound selected from the group consisting of methanol, ethanol and propanol.

10. The method according to claim 8, wherein the electrolyte solution further contains LiOH.

11. The method according to claim 1, wherein the metal oxide is selected from the group consisting of nickel oxide and silver oxide.

12. The method according to claim 1, wherein the hydrogen storage alloy is at least one alloy selected from the group consisting of $LaNi_{4.7}Al_{0.3}$; $MmNi_{4.2}Mn_{0.8}$ ("Mm" representing a misch metal: a mixture of La, Ce, Pr and Sm); and $LmNi_{4.2}Mn_{0.6}Al_{0.2}$ ("Lm" representing a La-rich misch metal).

13. The method according to claim 1, wherein the alkaline aqueous solution is a KOH aqueous solution.

14. The method according to claim 1, wherein the electrolyte solution is poured into the container after the anode, cathode, separator and pre-charging member have been housed in the container.

15. The method according to claim 1, wherein the anode, cathode and separator are laminated one upon the other in the order mentioned and, then, the laminate is spirally wound and subsequently housed in the container.

16. A sealed metal oxide-hydrogen storage cell produced by housing in a container a cathode containing a metal oxide as an active material, an anode containing a hydrogen storage alloy as the main component, a separator for separating the cathode and the anode, a pre-charging member electrically combined with the anode and consisting of a metal having a less noble potential than the hydrogen electrode potential within an alkaline solution or a material containing said metal as the main component, wherein said pre-charging metal will be ionized by the anodic oxidation and will be dissolved in the electrolyte solution during pre-charging, and an electrolyte solution consisting of an alkaline aqueous solution.

17. The storage cell according to claim 16, wherein the pre-charging member is a metal selected from the group consisting of tin, germanium, molybdenum, zinc, chromium, silicon, iron, indium, vanadium, manganese, boron, aluminum and zirconium.

* * * * *